United States Patent [19]

Nyul

[11] 3,878,556

[45] Apr. 15, 1975

[54] MODULARIZED LASER DIODE ASSEMBLY

[75] Inventor: Paul Nyul, New Holland, Pa.

[73] Assignee: RCA Corporation, New York, N.Y.

[22] Filed: Oct. 3, 1973

[21] Appl. No.: 403,026

[52] U.S. Cl. ...................... 357/81; 357/17; 357/82; 331/94.5

[51] Int. Cl. ............................ H01l 3/00; H01l 5/00

[58] Field of Search ......... 317/235, 27, 234, 234 A, 317/234 H, 234 G; 331/94.5

[56] References Cited

UNITED STATES PATENTS

| | | | |
|---|---|---|---|
| 3,568,761 | 3/1971 | Berger | 317/234 H |
| 3,581,162 | 5/1971 | Wheatley | 317/234 H |
| 3,622,906 | 11/1971 | Nyul | 317/235 N |
| 3,711,789 | 1/1973 | Dierschke | 317/235 N |
| 3,760,175 | 9/1973 | Gibson et al. | 317/234 A |
| 3,771,031 | 11/1973 | Kay | 317/235 N |

*Primary Examiner*—Andrew J. James
*Attorney, Agent, or Firm*—G. H. Bruestle; C. L. Silverman

[57] ABSTRACT

Laser diodes are mounted on one or more of the edge surfaces of a triangularly shaped header with the light emitting surfaces of the laser diodes all facing in substantially the same direction. A plurality of triangular headers can be mounted on a supporting base with an edge surface of each of the headers abutting an edge surface of an adjoining header and the light emitting surfaces of each of the diodes facing in substantially the same direction.

15 Claims, 5 Drawing Figures

MODULARIZED LASER DIODE ASSEMBLY

BACKGROUND OF THE INVENTION

The invention herein described was made in the course of or under a contract or subcontract thereunder with the Department of the Army.

The present invention relates to a modularized laser diode assembly, and particularly to such an assembly in which the laser diodes are mounted on assemblies which can be easily arranged in desired configurations. The assembly is particularly useful for producing aligned beams of coherent light.

It has been proposed to provide an assembly of laser diodes by disposing a plurality of diodes on a supporting base and electrically connecting the diodes. These prior art assemblies, however, have been relatively difficult and expensive to manufacture and employ because laser diodes are very small and consequently difficult to arrange in an optically aligned pattern. Furthermore, these prior art assemblies are not flexible enough to meet the varying needs of the user.

SUMMARY OF THE INVENTION

A laser diode assembly includes a header having a pair of opposed triangularly shaped surfaces and edge surfaces extending between the opposing surfaces. At least one laser diode is mounted on one of the edge surfaces. The laser diode has therein a PN junction extending substantially parallel to the edge surface of the header upon which it is mounted with the light emitting surface of the laser diode substantially parallel to the triangular surfaces. A plurality of laser diode assemblies can be mounted on a supporting base with the light emitting surfaces of each of the diodes facing in substantially the same direction.

DETAILED DESCRIPTION

Figure 1:
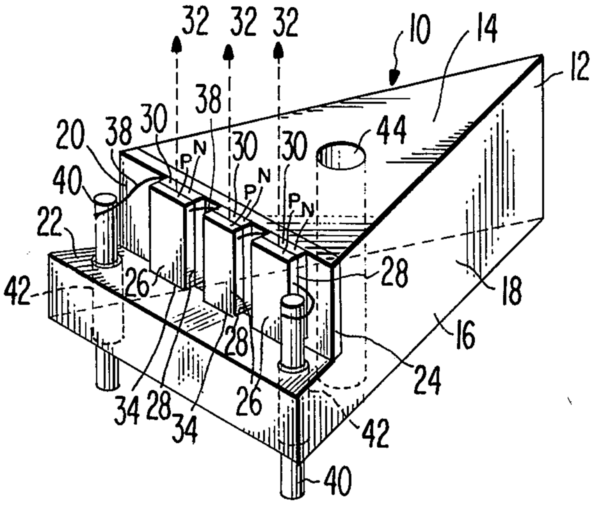
FIG. 1 is a perspective view of one form of the laser diode assembly of the present invention.

Referring initially to FIG. 1, one form of the laser diode assembly of the present invention is generally designated as 10. The assembly 10 comprises a triangularly shaped header 12 of a thermally conductive material, such as copper. The header 12 has a top triangular surface 14 and a bottom triangular surface 16. Edge surfaces 18 extend between the triangular surfaces 14 and 16. An equilateral header 12, as shown, is preferred as such a header can be combined together to form a maximum number of desirable configurations. However, right, scalene, or isosceles headers may also be successfully employed. One of the edge surfaces 18 includes a step having therein a riser surface 20 and a tread surface 22.

A strip 24 of electrically insulating material is mounted on riser surface 20. The insulating strip 24 should also be a good conductor of heat such as beryllium oxide, aluminum oxide and silicon dioxide. A plurality of laser diodes 26 are mounted in spaced relation on the insulating strip 24. The laser diodes 26 are substantially similar in structure and formed on the insulating strip 24 as those described in U.S. Pat. No. 3,471,923 entitled "Method of Making Diode Arrays," issued on Oct. 14, 1969. Each laser diode 26 has therein a light emitting edge surface 30, rear surface 34 and PN junction 28. The laser diodes 26 are mounted on the riser surface 20 with the PN junctions 28 being substantially parallel to riser surface 20 and the light emitting edge surfaces 30 being substantially parallel to triangular surfaces 14 and 16 and facing away from tread surface 22. Rear surfaces 34 of laser diodes 26 are spaced from the tread surface 22, thereby fully insulating laser diodes 26 from header 12. Thus, laser diodes 26 all emit light in one direction as shown by dashed arrows 32. While three diodes are shown in the assembly 10 for illustrative purposes, the assembly 10 may contain more or less diodes as would be desirable and practical. Laser diodes 26 are electrically connected by wires 38 as described in the previously mentioned U.S. Pat. No. 3,471,923. Although a series connection is shown, the laser diodes 26 may also be connected in parallel. The laser diodes 26 could also be successfully connected by any other well known and available method.

Figure 2:
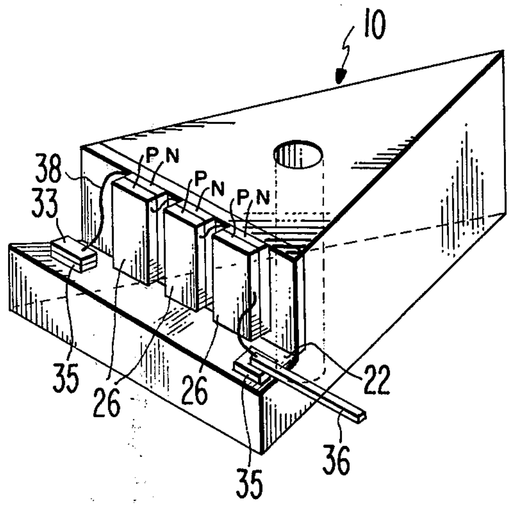
FIG. 2 is a perspective view of one form of an alternate terminal arrangement of the laser diode assembly of the present invention.

Again referring to FIG. 1, terminal pins 40 are provided for electrically connecting the assembly 10. The terminal pins 40 extend through the header 12 so as to project beyond triangular surface 16. The terminal pins 40 are electrically connected to the laser diodes 26 by wire 38. Bushing 42 comprised of an electrically insulating material such as glass, plastic, epoxy, insulating resins and the like extends through the header 12 surrounding terminal pins 40, thereby insulating terminal pins 40 from header 12. Although terminal pins 40 are shown, the assembly would operate successfully if terminal wires or electrical contacts were provided on each assembly 10. One of many possible arrangements is shown in FIG. 2 where wire 38 is connected to metallized terminal area 33 which is mounted on insulating pad 35. Insulating pads 35 are necessary when terminal area 33 is mounted on uninsulated tread surface 22 as shown. Insulating pad 35 can have terminal area 33 for one contact and terminal 36 for the other contact for easy connection to adjacent assembly 10. In addition, the assembly 10 includes a mounting hole 44 extending through header 12 as shown in FIG. 1.

Figure 3:
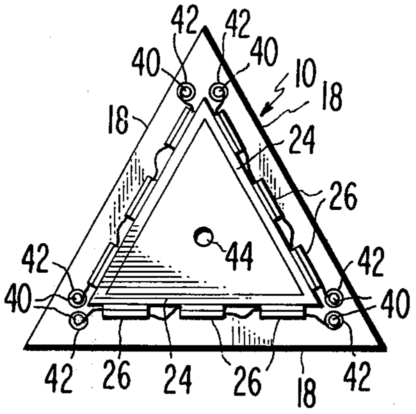
FIG. 3 is a top view of another form of the laser diode assembly of the present invention.

Although FIG. 1 shows a step on only one edge surface 18, FIG. 3 shows laser diodes 26 mounted on steps included on a plurality of edge surfaces 18. Furthermore, although only one step is shown on any one edge surface 18, a plurality of steps could be included on one or more edge surfaces 18 as described in U.S. Pat. No. 3,622,906 entitled "Light Emitting Diode Array," issued to Paul Nyul on Nov. 23, 1971.

Figure 4:
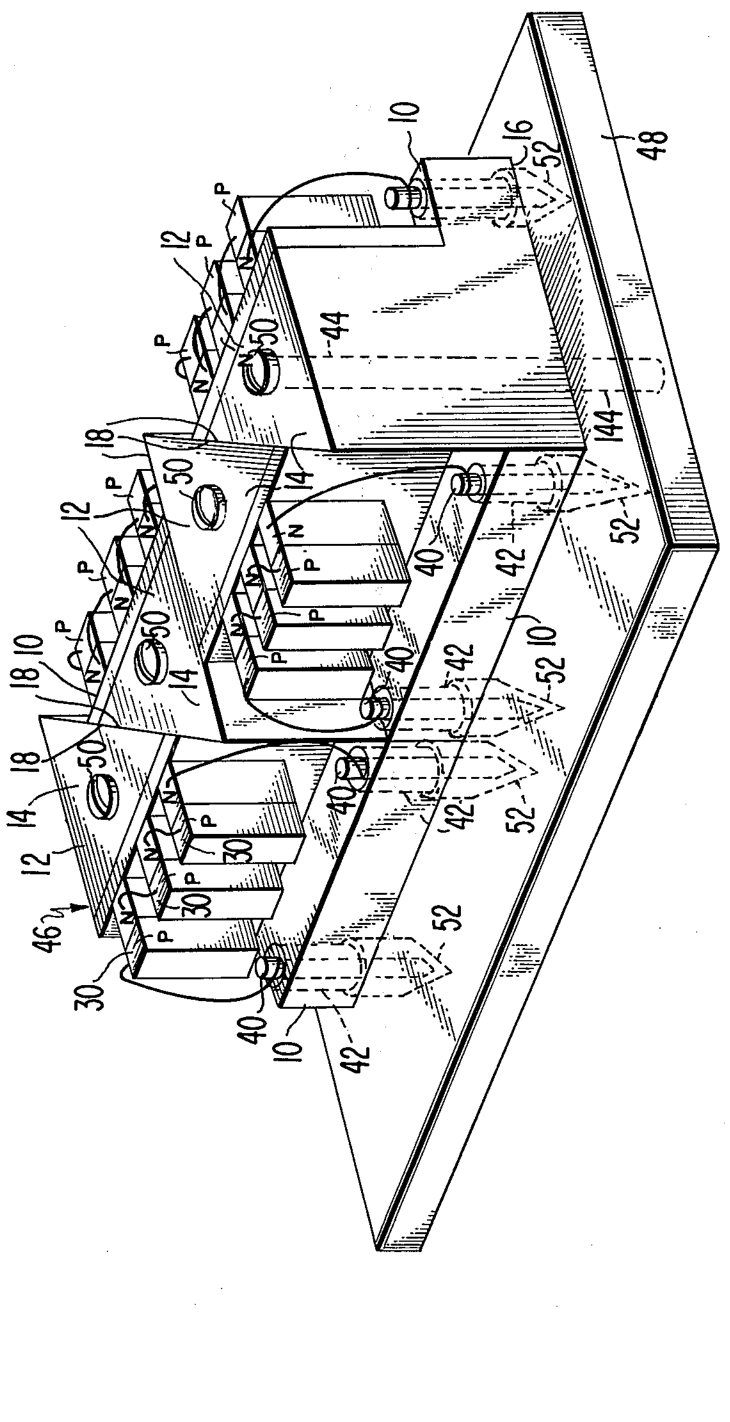
FIG. 4 is a perspective view of one possible modularized laser diode assembly.

The assemblies 10 can be combined together to form a modularized laser diode assembly 46 as illustrated in FIG. 4. FIG. 4 illustrates one of the many possible configurations. Each one of the assemblies 10 may be secured to a supporting base 48 as shown. The supporting base 48 is a thermally conductive material capable of adequately securing a plurality of assemblies 10. Conducting metals such as copper, nonconducting materials such as beryllium oxide and aluminum oxide as well as plastics are suitable materials for supporting base 48.

The assemblies 10 are mounted on the supporting base 48 with an edge surface 18 of each header 12 abutting an edge surface 18 of an adjoining header 12. The triangular surfaces 14 and 16 of each of the headers 12 respectively lie in substantially the same plane and the light emitting PN surfaces 30 of each of the headers 12 face in substantially the same direction. The assemblies 10 can be secured to the supporting base 48 by bolts 50 or any other well known means for securing, e.g., studs. If bolts 50 or studs are employed to secure the assembly 10, supporting base 48 should include receiving holes 144. The supporting base 48 includes terminal pin receptacles 52 which receive pin terminals 40 when the assemblies 10 with terminal arrangements similar to FIG. 1 are mounted thereon. The pin receptacles 52 should be insulated if a conducting material, such as copper, is used in the construction of supporting base 48. The pin receptacles 52 can be connected electrically for series or parallel operation through any well known and available method. The modularized laser diode assembly 46 can also be constructed without the use of pin terminals 40 and pin receptacles 52 by employing terminal wires or electrical contacts on each assembly 10 as shown in FIG. 2.

Figure 5:
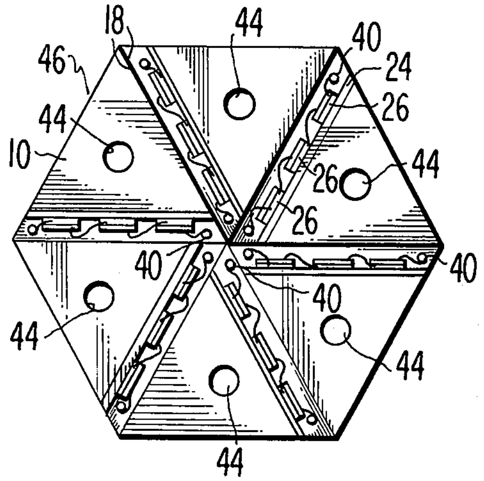
FIG. 5 is a top view of another possible modularized laser diode assembly.

In the use of the modularized laser diode assembly 46, laser diode assemblies 10 are combined together to form a desired configuration. The number of assemblies mounted on the supporting base is variable as is the number of diodes mounted on each assembly. Preferably, the number of diodes mounted on each assembly is optimized; that is, minimizing the number of diodes committed to an assembly which are lost if one diode of the assembly is inoperable and, at the same time, maximizing the number of diodes per assembly. In addition, by varying the triangular shape of the assemblies 10 employed, the user can vary the possible resulting configurations. For example, employing an equilateral header will enable the user to construct modularized laser diode assemblies with a maximum number of configurations. Furthermore, the user can combine a plurality of appropriately shaped triangular headers to form modularized laser diode assemblies in such shapes as squares, rectangles, rhombuses, parallelograms, etc. For example, a hexogonal modularized laser diode assembly as in FIG. 5.

Thus, there is provided by the present invention laser diode assemblies that substantially overcome or minimize disadvantages of the prior art assemblies. The improved assemblies are simply and inexpensively manufactured. The assemblies can be combined to form the desirable configurations while maintaining excellent replaceability features.

I claim:

1. A laser diode assembly comprising a header having a pair of opposed triangularly shaped surfaces and edge surfaces extending between said opposing surfaces, and at least one laser diode mounted on one of said edge surfaces, said laser diode having therein a PN junction extending substantially parallel to said one edge surface of said header with the light emitting surface of said laser diode substantially parallel to said triangular surfaces.

2. An assembly in accordance with claim 1 wherein said opposed triangularly shaped surfaces of said header are each in the form of an equilateral triangle.

3. An assembly in accordance with claim 1 including a plurality of said laser diodes mounted on said one edge surface of said header.

4. An assembly in accordance with claim 1 including a separate one of said laser diodes mounted on each of a plurality of said edge surfaces of said header.

5. An assembly in accordance with claim 1 including terminal pins electrically connected to said laser diode and extending through said header so as to project beyond one of said triangular surfaces.

6. An assembly in accordance with claim 1 in which at least one of said edge surfaces of said header includes a step, said step being defined by a riser surface and a tread surface, said laser diode being mounted on said riser surface of said step with said light emitting surface of said laser diode facing away from the tread surface of said step.

7. An assembly in accordance with claim 6 including a plurality of said laser diodes on each of said steps.

8. A modularized laser diode assembly comprising a plurality of triangularly shaped headers, each of said headers having a pair of opposed triangularly shaped surfaces and edge surfaces extending between said opposing surfaces, at least one laser diode mounted on one of said edge surfaces of each of said headers, said laser diode having therein a PN junction extending substantially parallel to said one edge surface with the light emitting surface of said laser diode substantially parallel to said triangular surfaces, and said headers being mounted with an edge surface of each of said headers abutting an edge surface of an adjoining header, said triangular surfaces of each of said headers respectively lying in substantially the same plane and the light emitting surfaces of each of said diodes facing the same direction.

9. A modularized laser diode assembly in accordance with claim 8 including a supporting base upon which said headers are mounted.

10. A modularized laser diode assembly in accordance with claim 9 including means for securing said headers to said supporting base.

11. A modularized laser diode assembly in accordance with claim 10 including means for electrically connecting said diodes.

12. A modularized laser diode assembly in accordance with claim 11 wherein each of said headers includes terminal pins electrically connected to said laser diodes and extending through said header so as to project beyond one of said triangular surfaces and said supporting base includes terminal pin receptacles receiving said terminal pins.

13. A modularized laser diode assembly in accordance with claim 8 wherein each of said headers include a plurality of said laser diodes on said one edge surface.

14. A modularized laser diode assembly in accordance with claim 8 wherein each of said opposed triangular surfaces of said headers is in the form of an equilateral triangle.

15. A modularized laser diode assembly in accordance with claim 8 wherein at least one of said edge surfaces of each one of said headers includes a step, said step being defined by a riser surface and a tread surface, said laser diode being mounted on said riser surface of said step with said light emitting surface of said laser diode facing away from the tread surface of said step.

* * * * *